Oct. 11, 1966 A. W. RZANT 3,278,717
WELDER
Filed March 15, 1963 2 Sheets-Sheet 1
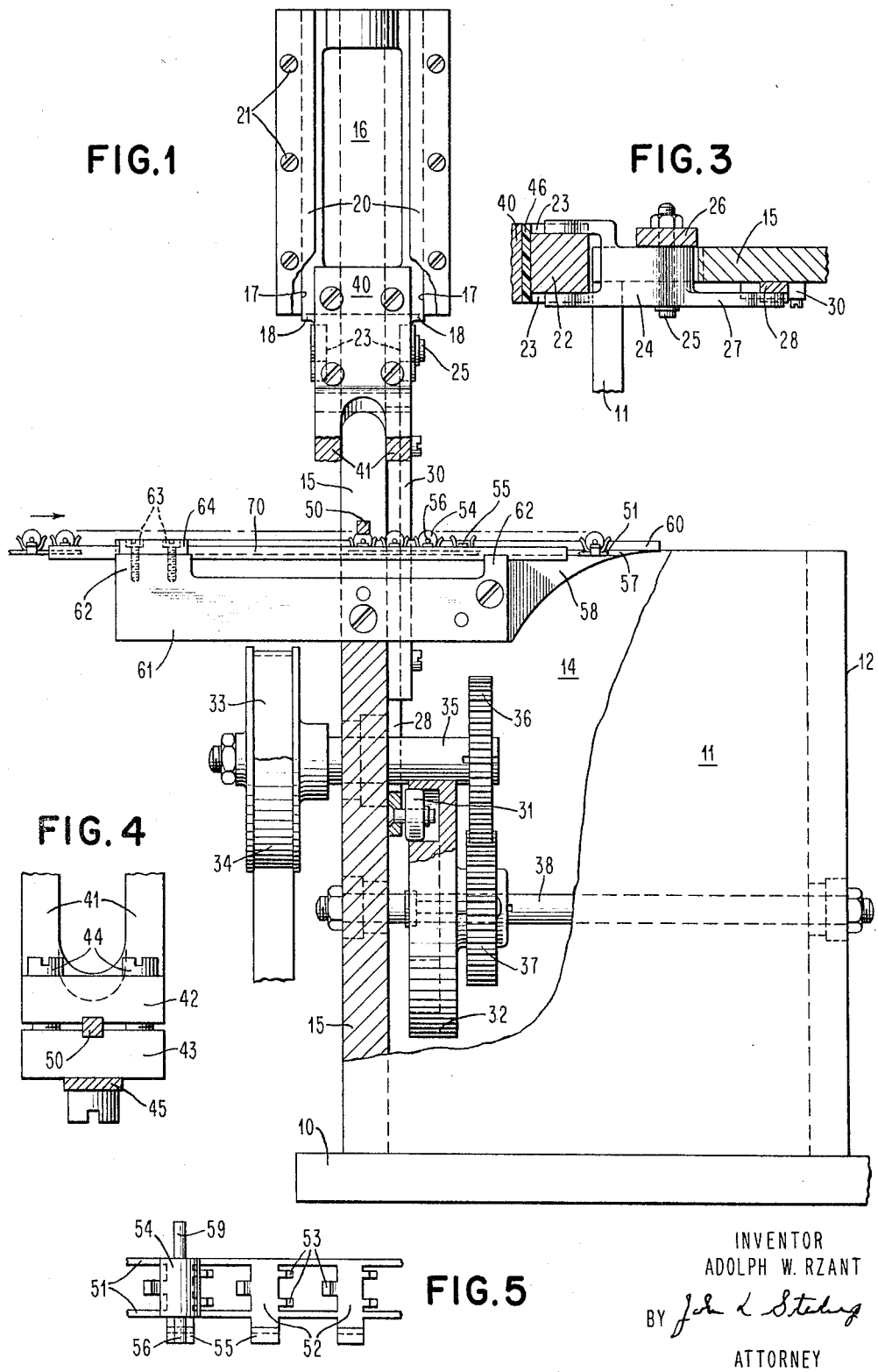
INVENTOR
ADOLPH W. RZANT
BY John L Sterling
ATTORNEY

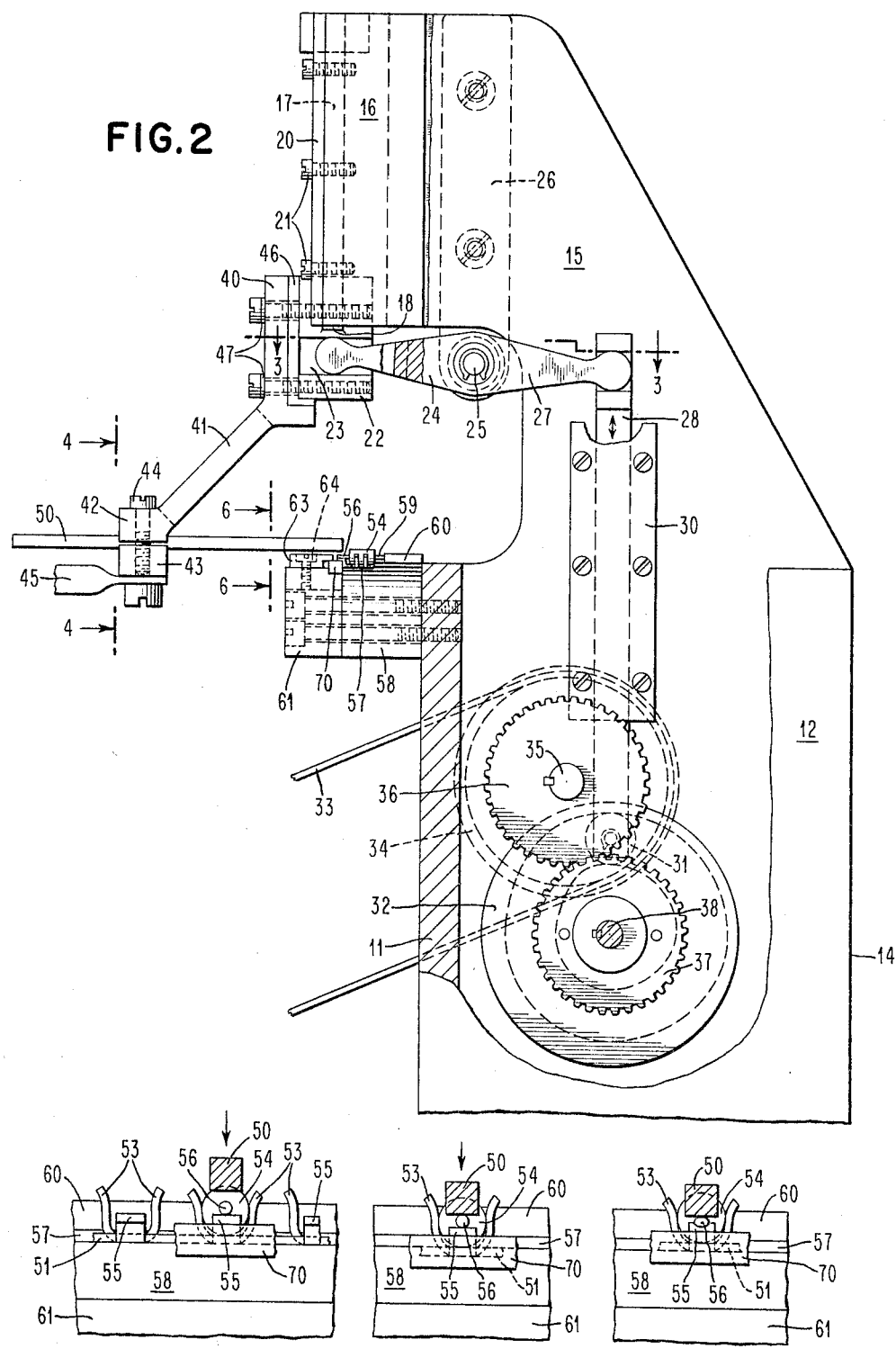

United States Patent Office 3,278,717
Patented Oct. 11, 1966

3,278,717
WELDER
Adolph W. Rzant, Poughkeepsie, N.Y., assignor to International Business Machines Corporation, New York, N.Y., a corporation of New York
Filed Mar. 15, 1963, Ser. No. 265,459
5 Claims. (Cl. 219—80)

This invention relates to electric bonding and more particularly to bonding of small-sized parts, especially where magnetic fields are generated and/or pressure during bonding is desired.

Since the advent of miniaturization, many problems have arisen in the area of circuit connections. Connections which were formerly made by soldering can no longer be used due to excess solder flow which causes short circuits and double connections. The alternatives are wire wrapping and electric bonding. In bonding fine wires to contacts, it has been found that the magnetic fields generated about parallel electrodes caused a repelling action that weakened the bond and in many cases failed to effect a bond. Also, in most brazers or welders, the electrodes are rigid and do not permit any take up or follow up during the actual bonding period while the metals are ductile.

An object of this invention to provide electric bonding apparatus in which the electrodes are positioned so as to minimize the effect of magnetic fields and so overcome the aforenoted disadvantages.

Another object is to provide a mounting for the electrodes or bonding members whereby they are free to follow and maintain constant pressure on the members during the bonding period.

In the disclosed embodiment the electrodes are positioned at right angles to each other, one being mounted as a cantilever and the other freely bridged between two in order to be flexible at its center section. The right angle cancels generated magnetic fields. Both electrodes are free to flex to the extent that, after pressure has been applied and while the metal of the parts is ductile, the electrodes may follow thereby keeping a constant pressure until the bond is completed.

The realization of the above objects, along with features and advantages of the invention, will be apparent from the following more particular description of the disclosed embodiment of the invention, as illustrated in the accompanying drawings.

In the drawings:

FIG. 1 is a front elevation of the invention as used in welding components to a strip.

FIG. 2 is a side elevation of FIG. 1 showing the drive for the upper electrode.

FIG. 3 is an enlarged cross section taken along line 3—3 of FIG. 2 showing the drive arm for the upper electrode.

FIG. 4 is an enlarged cross section taken along line 4—4 of FIG. 2 showing the clamp end of the bracket for the upper electrode.

FIG. 5 is a plan view of the strip to which a component is welded.

FIG. 6 is an enlarged positional view locating the electrode and the parts prior to welding.

FIG. 7 is similar to FIG. 6 and shows the position of the electrodes during the heating and melting of the insulation on the component.

FIG. 8 is similar to FIG. 6 and shows the electrodes in the final welding position.

The electrical bonding apparatus or resistance welder as shown in FIG. 1 comprises a base 10 to which is secured by any well known means, as by welding, a U-shaped casting comprising walls 11, 12 and 14. Secured in the open side of the U is a plate 15 shaped as shown in FIG. 2 having a block 16 welded to the upper edge. A channel 17 formed in the block provides a guide for a slide 18 that is held in place by plates 20 secured to the block by screws 21. Formed on the bottom of the slide is a block 22 that is slotted on each side at 23. These slots are engaged by rounded ends of a forked rocker arm 24 formed as shown in FIG. 3. The rocker arm is journalled on a stub shaft 25 carried in the end of a plate 26 secured to the left hand side of plate 15. The arm 24 has a rearwardly extending part 27 that engages the slotted head of a slide 28. The slide acts in a U-shaped guide member 30 secured to the right hand face of plate 15. The lower end of slide 28 is provided with a roller 31 that engages a box cam 32. The cam is driven by a belt 33 and pulley 34 secured to shaft 35 and gears 36 and 37 secured to shafts 35 and 38.

Secured to block 22 by any well known means such as screws, is a bracket 40 formed as shown in FIGS. 2 and 4 comprising two forwardly extending legs 41 ending in a foot 42 forming the upper part of a clamp, the lower foot member 43 being held in clamping engagement about the upper electrode 50 by screws 44. A terminal 45 of a feed cable for the electrode is secured to member 43. A plate 46 and washers 47 (FIG. 3) of rubber or any suitable insulating material separates the bracket 40 from block 22.

The embodiment being described is shown as used in welding one lead of a component to a lug on a component holder. This holder arrangement is described in application S.N. 77,200 filed by L. J. Allen et al., December 20, 1960. It is obvious, however, that many other similar parts may be welded such as leads to connectors connected in chains, a plurality of fine wires to a metallic plate, such as in core planes and many other applications wherein fine wires of various alloys are to be welded to a carrier.

The component holder comprises a long thin strip of metal, such as phosphor bronze, formed as shown in FIG. 5 having a pair of continuous rails 51 and extending therebetween a series of regularly spaced cross members 52 having component grasping or holding fingers 53 to embrace a cylindrical component 54 such as a capacitor, diode or the like. A tab 55 is formed on one of the rails. The rails, fingers and tabs are punched out of a strip and the fingers and tabs formed as shown in FIG. 6. The tab is bent into alignment with the lead 56 of the component in such manner that the lead will be in contact with the tab when the component is firmly held in the fingers 53. This aids in the welding. The other lead 59 of the electrical component extends beyond the lower rail 46 (upper in FIG. 5) and is adapted to be inserted into a land of a printed circuit as described in the Allen application.

A track 57 (FIGS. 2 and 6) for feeding the strip is formed in a block 58 that is secured to plate 11. A block 60 to the rear of the track acts as a guide for the components. A second block or base 61 also secured to plate 11 is formed with a pair of vertical arms 62 thereon that are channeled to hold the ends of a lower electrode 70. The electrode is clamped in place on the left hand arm 62 by a block 63 held by screws 64. The other end of the electrode 76 is free to slide on block 61 during flexure as described later.

In operation the strip is fed component by component by any suitable means (not shown) with the tab 55 sliding along lower electrode 70 until the tab and lead 56 are under the upper electrode 50. By suitable timing means (not shown), the pulley 34 is driven at a speed such that box cam 32 can rotate thru a cycle in which a weld can be made and allow sufficient time (with the electrode 50 raised) to permit the strip carrying the next component to be fed. If, as shown in FIG. 5, components are omitted, current is not applied to the electrodes, even though they go through their usual cycle. This is not a part of the present invention; therefore, it will not be explained in detail. It is sufficient to state that, when the components are inserted on the strip before reaching the welder, a condition is set up in the welding circuit to note the presence or absence of a component.

The cam 32 cooperating with slide 28 rocks forked arm 24 to lower the electrode 50 until it contacts lead 56 and then travels slightly further, flexing the lower electrode 70 downwardly to the position of FIG. 7, at which time, the current is applied. As the lead 56 softens (as shown in FIG. 8), the electrode 70 tends to return to normal, thus following the weld and holding it under pressure until completed. It is a well known fact that a magnetic field is generated about a conductor of electricity. It has also been found that when two electrodes of a welder are mounted parallel with current flow in opposite directions toward a weld point the magnetic fields thus set up are opposing. Thus, there is a tendency for light electrodes (similar to those described) to be forced apart which results in poor welds. In the present device, it is noted that the electrode 50 is mounted at a right angle to the electrode 70, resulting in the negation of the fields about each which have the same cross-sectional area. This results in the electrodes being free to flex and follow the weld without interference.

One change within the scope of this invention would be an arrangement wherein one electrode would be a U-shaped, heating electrode and the other electrode would be flexible. One part could be coated with a brazing material.

While the invention has been particularly shown and described with reference to a preferred embodiment thereof, it will be understood by those skilled in the art, that the foregoing and other changes in disclosed form and details may be made therein without departing from the spirit and scope of the invention.

What is claimed is:
1. In an electric bonding apparatus especially adapted for use in joining small-sized parts wherein uniform pressure throughout bonding and/or the effect of generated magnetic fields during current flow is a problem, the improvement comprising:
   first and second extended electrodes arranged respectively in two generally-parallel, longitudinal planes and at an angle to each other so as to overlie each other, said angle being such as to substantially cancel generated magnetic fields when present,
   support means for said first electrode and said second electrode and being arranged to move said electrodes toward each other, and
   conveying means adapted to move two small parts to be bonded to a position between said electrodes at a location adjacent to where said electrodes overlie each other.

2. The apparatus according to claim 1 and being further characterized by:
   said support means and said electrodes being constructed so that said electrodes are flexed prior to bonding and then move closer together during bonding whereby a generally constant pressure is maintained throughout bonding.

3. The apparatus according to claim 1 and being further characterized by:
   said angle of said electrodes being ninety degrees, and at least one of said electrodes being resiliently mounted in said support means so that said electrodes are flexed relative to each other at the beginning of bonding.

4. The apparatus according to claim 1 and being further characterized by:
   said first electrode being mounted in cantilever fashion in said support means, and
   said second electrode being arranged at a right angle to and in alignment with the end of said first electrode and being of such length and so supported that it is flexible at its center section.

5. The apparatus according to claim 4 and being further characterized by:
   bracket means forming a part of said support means and providing for mounting said first electrode in cantilever fashion, and
   rocker arm means for reciprocating said bracket means and thus said first electrode so that said first electrode moves into bonding position.

References Cited by the Examiner

UNITED STATES PATENTS

| | | | |
|---|---|---|---|
| 1,363,933 | 12/1920 | Trimble | 219—56 X |
| 2,433,354 | 12/1947 | Fotie | 219—78 |
| 2,637,798 | 5/1953 | Burge et al. | 219—79 |
| 2,688,065 | 8/1954 | Clark | 219—86 |
| 2,889,446 | 6/1959 | Gartner et al. | 219—86 |
| 3,148,264 | 9/1964 | Van Alan Clark et al. | 219—86 |
| 3,180,968 | 4/1965 | Bower | 219—78 |

FOREIGN PATENTS 154,849  12/1920  Great Britain.

RICHARD M. WOOD, *Primary Examiner.*

B. A. STEIN, *Assistant Examiner.*